United States Patent
Sun et al.

(10) Patent No.: US 9,200,238 B2
(45) Date of Patent: Dec. 1, 2015

(54) POMELO PEEL ESSENTIAL OIL EXTRACTION METHOD BY PEEL ICING AND BREAKING

(71) Applicant: SOUTH CHINA UNIVERSITY OF TECHNOLOGY, Guangzhou City (CA)

(72) Inventors: Dawen Sun, Guangzhou (CN); Xin'an Zeng, Guangzhou (CN); Zhong Han, Guangzhou (CN); Zhongyue Xu, Guangzhou (CN); Rong Fan, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 14/395,611

(22) PCT Filed: Dec. 18, 2012

(86) PCT No.: PCT/CN2012/086834
§ 371 (c)(1),
(2) Date: Oct. 20, 2014

(87) PCT Pub. No.: WO2013/155850
PCT Pub. Date: Oct. 24, 2013

(65) Prior Publication Data
US 2015/0073161 A1 Mar. 12, 2015

(30) Foreign Application Priority Data

Apr. 19, 2012 (CN) .......................... 2012 1 0117126

(51) Int. Cl.
| | | |
|---|---|---|
| *C11B 1/00* | (2006.01) | |
| *C11B 9/02* | (2006.01) | |
| *A23L 1/212* | (2006.01) | |
| *A23L 1/222* | (2006.01) | |

(52) U.S. Cl.
CPC ................. *C11B 9/02* (2013.01); *A23L 1/2126* (2013.01); *A23L 1/2225* (2013.01)

(58) Field of Classification Search
CPC .................................... C11B 1/12; C11B 1/00
USPC ............................................................ 554/8
See application file for complete search history.

(56) References Cited

FOREIGN PATENT DOCUMENTS

| | | |
|---|---|---|
| CN | 1202228 C | 5/2005 |
| CN | 1332008 C | 8/2007 |
| CN | 101195789 A | 6/2008 |
| CN | 101381654 A | 3/2009 |
| CN | 102618387 A | 8/2012 |
| CN | 102703219 A | 10/2012 |

OTHER PUBLICATIONS

Song, Ping et al., Research Status of Extraction and Application of Essential Oil of Pomelo Peel, Storage and Process .Jan. 2012 , No. 1, No. 1, pp. 51-54.*
Fang et al., "Comprehensive Utilization of the Peel of the Citrus Grandis Var. Shatin-You," Food & Machinery, Jun. 1996, No. 6, pp. 34-35.
Song et al., "Research Status of Extraction and Applications of Essential Oil of Pomelo Peel," Storage and Process, Jan. 2012, vol. 12, No. 1, pp. 51-54.
Mar. 28, 2013 International Search Report issued in International Application No. PCT/CN2012/086834.

* cited by examiner

*Primary Examiner* — Deborah D Carr
(74) *Attorney, Agent, or Firm* — Oliff PLC

(57) ABSTRACT

A method of ice-crystal wall-breaking extraction of the pomelo peel essencial oil, including: first selecting a fresh pomelo, peeling off the outmost oil cell layer with a peeler, and collecting the cortex that is 1.5-2.5 mm thick; slowly freezing the pomelo peel oil cell layer at −15° C. to −30° C. to form ice crystal; breaking the pomelo peel ice crystal with a breaker; thawing the broken ice crystal, and then squeezing with a screw squeezer to obtain a squeezed mixed liquid; adding 3-4% by mass of the table salt to the squeezed mixed liquid, and standing to stratify at reduced pressure, thereby obtaining an oil-water mixture; distilling the mixed liquid at reduced pressure, and collecting the distillate to obtain an oil-water mixture that undergoes natural stratification; discarding the water layer, thereby obtaining the pomelo peel essential oil.

6 Claims, No Drawings

POMELO PEEL ESSENTIAL OIL EXTRACTION METHOD BY PEEL ICING AND BREAKING

FIELD OF THE INVENTION

The present invention relates to a method of pomelo peel essential oil extraction, especially to a method of ice-crystal wall-breaking extraction of the pomelo peel essential oil, by which the pomelo peel oil cell layer is frozen to generate ice crystal, then the ice crystal is broken, thawed, and allowed to stand, so as to extract the pomelo peel essential oil.

BACKGROUND OF THE INVENTION

More than 3,000 plants containing essential oil have been found so far around the world. There are about 500 natural spices specified in the catalogues on the international market, about 200 of which are practically used as natural spices and sold as merchandise. At present, there are more than 120 natural spices that have been able to be produced in our country, such as cinnamon oil, peppermint oil, eucalyptus oil and turpentine, with the annual output standing in the front ranks of the world. Essential-oil plants, mainly seed plants, especially aromatic plants, are widely distributed in the nature of our country. There are 56 families, 136 genera and about 300 species of aromatic plants wild and cultivated in our country, with lemon oil, orange oil, limette oil and bergamot oil being imported much more than being exported for our country. They can be obtained by extraction or distillation recovery as a byproduct of the citrus juice processing. The main ingredient thereof, D-limonene, can be distilled out at atmospheric pressure without decomposition. Pomelo peel, accounting for 43% to 48% of the whole pomelo, in addition to containing such nutrients as water, vitamins and minerals that are essential to the human body, also contains a variety of non-nutritive physiologically active ingredients that are beneficial to the human health, such as flavonoids, limonoids, essential oils, natural pigments, and dietary fiber, which are more than those in the pomelo fruit and have higher health care and medicinal value.

The pomelo peel essential oil, containing many chemical ingredients, is a mixture and essentially consists of aliphatic compounds, aromatic compounds and terpenoids; the pomelo essential oil has a unique aroma, but can be neither chemically synthesized nor replaced by other citrus so far. Currently the pomelo peel essential oil is seldom sold on the market, while the demand for the pomelo peel essential oil has recently increased year by year, resulting in serious supply and demand imbalance. A squeezing method and a steam distillation method are often used for extraction of the citrus-peel essential oil, but both have some technical defects. With the squeezing method, the fresh pomelo peel is placed into a screw squeezer after being soaked with limewater, meanwhile an appropriate amount of spray water is used to elute the essential oil from the oil cell tissue, and then the essential oil is filtered with screen cloth, settles, and is separated by a high-speed centrifuge, so as to obtain a crude product of the citrus essential oil, which then undergoes solvent extraction and vacuum fractionation to get terpenoids eliminated, thereby producing the citrus essential oil without terpenoids; however, this method needs large workload of high-speed centrifugation in industry, and the oil will still contain some such impurities as pigments and mucilaginous substances after the high-speed centrifugation that are cumbersome to be separated. The steam distillation method, due to the high temperature process, will make some terpenoid ingredients oxidized and deteriorate, and have a low yield.

The Chinese invention patent 02152166.2 discloses a method of jasmine essential oil extraction by using the supercritical carbon dioxide. The Chinese patent 200510049888.9 discloses a process of citrus-peel essential oil extraction by squeezing with a sugarcane squeezer and then oil-water separation with a centrifuge. The Chinese invention patent 200810199137.9 discloses a method of essential oils extraction from the pomelo peel or orange peel by using the steam distillation. However, the methods involved in the above patents have the following problems: (1) The citrus essential oil is generally present in the oil cell layer thereof, having an epidermal thickness of 2.5-3 mm; the existing large-scale production of the citrus essential oil mostly adopts a water milling method to extract the oil-water mixture before separation. In terms of a pomelo, it has a thicker oil cell layer, a solid epidermis, and an irregular appearance, less likely to allow the large-scale application of the water milling method. (2) With the essential oil wrapped by a cell wall, simple squeezing or the water milling method is very difficult to get it extracted completely, and there are still some essential oils remaining in the oil cell layer and wrapped by fiber, resulting in a lower essential-oil extraction rate.

CONTENTS OF THE INVENTION

In order to overcome the defects present in the prior art, the purpose of the present invention is to provide a method of essential oils extraction that has the simple process and low cost, is applicable to industrial production, and can be more complete to get the essential oil extracted. Specifically, a method is used to extract essential oils by freezing and crystallizing and then breaking the pomelo peel oil cell layer.

The purpose of the present invention is achieved through the following technical solution:

A method of pemole peel essential oil extraction by peel ice crystal and wall-breaking, comprising the following steps:

(1) Selecting a fresh pomelo, and peeling off the outermost pomelo peel oil cell layer that is 1.5-2.5 mm in thickness;

(2) freezing the pomelo peel oil cell layer in Step (1) at $-15°$ C. to $-30°$ C. for 15-36 h to form the pomelo peel ice crystal;

(3) breaking the pomelo peel ice crystal with a breaker;

(4) thawing the broken pomelo peel ice crystal, and then squeezing with a screw squeezer to obtain the squeezed liquid;

(5) adding 3-4% by mass of the table salt to the squeezed liquid, and standing to stratify to obtain a mixed liquid;

(6) distilling the mixed liquid in Step (5) under reduced pressure, collecting the distillate to obtain an oil-water mixture that undergoes natural stratification, and discarding the water layer to obtain the pomelo peel essential oil.

Further, the pomelo peel oil cell layer is frozen at $-15°$ C. to $-30°$ C., with the diameter of the ice crystal of the pomelo peel ice crystal controlled to be over 100 μm.

The pomelo peel oil cell layer is frozen at $-20°$ C. to $-25°$ C. for 20-30 h. A pomelo peeler is used for peeling off the outmost pomelo peel oil cell layer. The broken pomelo peel ice crystal are thawed at $20°$ C. to $50°$ C. The squeezing is done twice: squeezing the thawed pomelo peel crystal liquid mixture with a screw squeezer for the first time, to obtain the squeezed liquid; and adding 10-20% water to the squeezed crystal from the first squeezing, and then squeezing with a screw squeezer for the second time.

The pomelo peel ice crystal that are broken with a breaker as described in Step (3) are sufficient to be squeezed to the extent well known by those skilled in the art that facilitates squeezing, such as 8-15 seconds for the Model FW135 pulverizer of the Tianjin Teste company, preferably pulverizing for 10 seconds, this pulverizer having a power of 800 W and a rotational speed of 24,000 r/min.

The present invention only selects the 1.5-2.5 mm thick pomelo peel oil cell layer of the pomelo peel surface layer, and gets rid of such parts as the sponge body and pulp that contain no essential oil, greatly improving the efficiency and reducing the workload. The pomelo peel oil cell layer is frozen at a low temperature, which is not preferred to be too low, preferably at −15° C. to −30° C., at which the ice crystal grows slowly and can grow to over 100 μm after 15-36 h; if the freezing temperature is too low, the freezing speed will be too high to allow the tiny ice crystal to grow. Then, with breaking in a frozen state, the formed ice crystal punctures the cell wall broken, and the ice crystal are squeezed after being molten, which can substantially extract the essential oil out of the cells and reduce the amount of the essential oil entrained in the fiber.

The breaking is performed on the pomelo peel in the frozen state by using a breaker.

The present invention has the following advantages compared to the prior art:

(1) The essential-oil extraction rate is improved by 20-25%. In the present invention, the pomelo epidermis is frozen at a low temperature within the range of −15° C. to −30° C., at which the ice crystal grows slowly and can grow to over 100 !um after 15-36 h; then, with breaking in a frozen state, the formed ice crystal punctures the cell wall broken, and the ice crystal are squeezed after being molten, which can substantially extract the essential oil out of the cells and reduce the amount of the essential oil entrained in the fiber.

(2) The process is simple and highly operable, and can be used for industrialized production, having small one-time investment in equipment, low cost and great earnings.

(3) Substituting a pomelo peeler for the traditional manual peeling not only saves manpower, but also improves the work efficiency substantially. With the pomelo peeler, the thickness of the peeled pomelo peel is uniform and can be also regulated as required, which is also advantageous for better squeezing.

DETAILED DESCRIPTION OF THE EMBODIMENTS

In order to further understand the present invention, the present invention will be further described below with reference to specific examples. However, the embodiments of the present invention are not limited thereto, and can also have many alterations.

Example 1

Selecting a fresh pomelo from Meixian County, Guangdong Province, washing it clean, and drying it in air; peeling off the outmost oil cell layer with a pomelo peeler, with the peeled peel uniform in thickness and set to be 1.5 mm thick; weighing 10 Kg pomelo peel oil cell layer after peeling, and freezing in a cryogenic freezer at a freezing temperature of −15° C. for 36 h. By microscopic observation, it is found that the maximum size of the oil-cell-layer ice crystal reaches 500 μm, with all the peel frozen into a solid. Taking out the cortex after freezing, pulverizing it with a pulverizer (the Tianjin Teste company, Model FW135 , power 800 W, rotational speed 24,000 r/min, 10 seconds), and thawing at the room temperature (20° C.); screw-squeezing after the thawing to obtain 7.2 Kg squeezed liquid, to which 3% by mass of the table salt is added (relative to the mass of the squeezed liquid); stirring to eliminate the "foam" at the interface to facilitate faster stratification, then standing to stratify for 2 h, and discarding the water layer; distilling the upper oil layer under reduced pressure at a temperature of 58° C. and a vacuum degree of 100 Pa, thereby obtaining an oil-water mixture that undergoes natural stratification; discarding the water layer, thereby obtaining 153.4 g pomelo peel essential oil. This example increases the essential oil yield by 20% compared to the traditional non-ice-crystal-freezing direct distillation. By the HPLC test, the resulting essential oil reaches a purity of 95%, and is a colorless transparent oily liquid, having pure aroma and no mixed odor, obviously characterized by the pomelo aroma.

Example 2

Selecting a fresh pomelo from Meixian County, Guangdong Province, washing it clean, and drying it in air; peeling off the outmost oil cell layer with a pomelo peeler, with the peeled peel uniform in thickness and set to be 2.0 mm thick; weighing 10 Kg pomelo peel oil cell layer after peeling, and freezing it in a cryogenic freezer at a freezing temperature of −20° C. for 30 h. By microscopic observation, it is found that the maximum size of the oil-cell-layer ice crystal reaches 400 μm, with all the peel frozen into a solid; taking out the solid and pulverizing it with a pulverizer (being the same as in Example 1 , pulverizing for 8 seconds), thawing in a water bath at 30° C., squeezing the thawed pomelo peel crystal liquid mixture with a screw squeezer for the first time to obtain the squeezed liquid, and meanwhile adding clear water that is 10% by mass of the squeezed crystal to the squeezed crystal from the first time squeezing so as to squeeze for the second time, thereby obtaining the squeezed liquid from the second time squeezing; the two-time squeezing produces 7.6 Kg squeezed mixed liquid altogether, to which is added 4% by mass of the table salt grains (relative to the mass of the squeezed mixed liquid); stirring the above mixed liquid to eliminate the "foam" at the interface, so as to facilitate faster stratification. Then standing to stratify for 2 h, discarding the water layer, distilling the upper oil layer under reduced pressure at a temperature of 60° C. and a vacuum degree of 80 Pa, thereby obtaining an oil-water mixture that undergoes natural stratification; discarding the water layer, thereby obtaining 160.4 g pomelo peel essential oil. This example increases the yield by 25% compared to the traditional method. By the HPLC test, the resulting essential oil reaches a purity over 95%, and is a colorless transparent oily liquid, having pure aroma and no mixed odor, obviously characterized by the pomelo aroma.

Example 3

Selecting a fresh pomelo, washing it clean, and peeling it with a pomelo peeler as described in Example 1 , with the peeled peel set to be 2.5 mm thick; weighing 10 Kg pomelo peel oil cell layer after peeling, and freezing it in a cryogenic freezer at a freezing temperature of −30° C. for 15 h. By microscopic observation, it is found that the maximum size of the oil-cell-layer ice crystal reaches 100 μm, with all the peel frozen into a solid; taking out the solid and pulverizing it with a pulverizer (being the same as in Example 1 , pulverizing for 15 seconds), stirring and thawing in a water bath (50° C.), squeezing the thawed pomelo peel crystal liquid mixture with a screw squeezer for the first time to obtain the squeezed liquid, and meanwhile adding clear water that is 20% by mass of the squeezed crystal to the squeezed crystal from the first time squeezing so as to squeeze for the second time, thereby obtaining the squeezed liquid from the second time squeezing; the two-time squeezing produces 7.8 Kg squeezed mixed liquid altogether, to which is added 3% by mass of the table salt grains (relative to the mass of the squeezed mixed liquid), stirring the mixed liquid, and standing to stratify for 1 h; discarding the water layer, and distilling the oil layer under reduced pressure at a distilling temperature of 63° C. and a vacuum degree of 60 Pa, thereby obtaining an oil-water mixture that undergoes natural stratification; discarding the water layer, thereby obtaining 156.1 g pomelo peel essential oil. This example increases the yield by 23% compared to the traditional method. By the HPLC test, the resulting essential oil reaches a purity over 95%, and is a colorless transparent oily liquid, having pure aroma and no mixed odor, obviously characterized by the pomelo aroma.

What is claimed is:

1. A method of pemole peel essential oil extraction by peel ice crystal and wall-breaking, wherein it comprises the following steps:
   (1) selecting a fresh pomelo, and peeling off the outermost pomelo peel oil cell layer that is 1.5-2.5 mm thick;
   (2) freezing the pomelo peel oil cell layer in Step (1) at −15° C. to −30° C. for 15-36 h to form pomelo peel ice crystal;
   (3) breaking the pomelo peel ice crystal with a breaker;
   (4) thawing the broken pomelo peel ice crystal, and then squeezing with a screw squeezer to obtain a squeezed liquid;
   (5) adding 3-4% by mass of table salt to the squeezed liquid, and standing to stratify to obtain a mixed liquid; and
   (6) distilling the mixed liquid in Step (5) under reduced pressure, and collecting distillate to obtain an oil-water mixture that undergoes natural stratification; discarding the water layer, thereby obtaining the pomelo peel essential oil.

2. The method of ice-crystal wall-breaking extraction of pomelo peel essencial oil according to claim 1, wherein the pomelo peel oil cell layer is frozen at −15° C. to −30° C., with the diameter of the ice crystal of the pomelo peel ice crystal controlled to be over 100 μm.

3. The method of ice-crystal wall-breaking extraction of pomelo peel essencial oil according to claim 2, wherein the pomelo peel oil cell layer is frozen at −20° C. to −25° C. for 20-30 h.

4. The method of ice-crystal wall-breaking extraction of pomelo peel essencial oil according to claim 1, wherein a pomelo peeler is used for peeling off the outmost pomelo peel oil cell layer.

5. The method of ice-crystal wall-breaking extraction of pomelo peel essencial oil according to claim 1, wherein the broken pomelo peel ice crystal are thawed at 20° C. to 50° C.

6. The method of ice-crystal wall-breaking extraction of pomelo peel essencial oil according to claim 1, wherein the squeezing is done twice: squeezing the thawed pomelo peel crystal liquid mixture with a screw squeezer for the first time, to obtain the squeezed liquid; and adding 10-20% water to the squeezed crystal from the first squeezing, and then squeezing with the screw squeezer for the second time.

* * * * *